United States Patent [19]

Krogsrud

[11] Patent Number: 4,541,991
[45] Date of Patent: Sep. 17, 1985

[54] MEANS FOR PROCESSING A SOLID GRAVEL LIKE MATERIAL WITH A FLUID

[75] Inventor: Harald Krogsrud, Gjettum, Norway

[73] Assignee: Elkem a/s, Oslo, Norway

[21] Appl. No.: 457,003

[22] Filed: Jan. 10, 1983

Related U.S. Application Data

[62] Division of Ser. No. 224,918, Jan. 14, 1981, Pat. No. 4,382,073.

[30] Foreign Application Priority Data

Jan. 18, 1980 [NO] Norway .................... 800118

[51] Int. Cl.[4] ............................................ B01D 11/02
[52] U.S. Cl. ...................................... 422/269; 266/168; 366/169; 422/232; 422/273; 423/658.5
[58] Field of Search .............. 422/232, 268, 269, 271, 422/273; 423/1, 658.5; 266/168; 75/101 R; 366/150, 169, 177

[56] References Cited

U.S. PATENT DOCUMENTS

| | | | |
|---|---|---|---|
| 1,214,113 | 1/1917 | Anderson | 366/169 X |
| 1,651,680 | 12/1927 | Eagle | 422/269 X |
| 1,943,330 | 1/1934 | Mitchell | 423/1 |
| 2,550,947 | 5/1951 | Straight | 422/268 X |
| 2,927,007 | 3/1960 | Kaether | 422/273 |
| 3,326,674 | 6/1967 | Newport et al. | 75/101 R |
| 3,525,606 | 8/1970 | Bodine | 423/1 |
| 3,592,395 | 7/1971 | Lockwood | 366/150 X |
| 3,743,539 | 7/1973 | Kroyer et al. | 366/169 X |
| 3,840,345 | 10/1974 | Andréet al. | 266/168 X |
| 3,885,017 | 5/1975 | Robinson et al. | 423/1 |
| 4,042,671 | 8/1977 | Boudish | 75/101 R |
| 4,184,775 | 1/1980 | Akizawa | 366/169 |

FOREIGN PATENT DOCUMENTS

| | | |
|---|---|---|
| 1030350 | 6/1953 | France . |
| 1172341 | 2/1959 | France . |
| 1200682 | 3/1960 | France . |
| 155214 | 7/1956 | Sweden . |
| 393122 | 5/1977 | Sweden . |
| 418725 | 10/1934 | United Kingdom . |
| 0708058 | 4/1954 | United Kingdom . |
| 0710191 | 6/1954 | United Kingdom . |
| 0731982 | 6/1955 | United Kingdom . |
| 1449785 | 9/1976 | United Kingdom . |

Primary Examiner—Barry S. Richman
Assistant Examiner—B. P. Heaney
Attorney, Agent, or Firm—Lucas & Just

[57] ABSTRACT

A method and an apparatus for treating a gravel type solid material with a liquid in a bath are described. The apparatus comprises means for supplying the solid material, means for transporting it through the bath and means for removing the processed solid material from the bath. The apparatus comprises further means for supply of liquid and tapping off of the liquor. The method comprises introduction of the gravel type solid material into the bath at its lower end and removal of the processed solid material at the upper end, the gravel type solid material being gradually transported upwards through the bath by means of rotating lifting members while liquid is introduced into the bath at its upper half while liquor is drained off at the lower half. The lifting member comprises at least one inclined plate which is rigidly fixed to a vertical tube through which the solid material is introduced into the bath or the tank.

9 Claims, 7 Drawing Figures

MEANS FOR PROCESSING A SOLID GRAVEL LIKE MATERIAL WITH A FLUID

This is a division of application Ser. No. 224,918, filed Jan. 14, 1981, now U.S. Pat. No. 4,382,073 issued May 3, 1983.

The present invention relates to a method and apparatus for treatment of gravel type, more or less coarse or crushed solid materials with a fluid in a bath or a tank. The apparatus comprises means for supplying the solid material to the bath, means for transporting the solid material within the bath and means for removing the processed solid material from the bath. The apparatus comprises further means for supplying the fluid to the bath and means for removal of the fluid from the bath subsequent to the treatment of the solid materials. In particular, but not exclusively, the present invention relates to a bath or a tank suited for leaching of minerals or the like.

By gravel type, more or less coarse or crushed solid materials are to be understood any grained sized natural or crushed solid minerals, ores or carbon material or concentrates, either in classified or in non-classified sizes and of any practical sizes.

In leaching processes of this type, highly concentrated acids having a high temperature are commonly used. Due to the use of concentrated and/or relatively hot acids and due to extensive wear on the apparatus high durability of the apparatus is required. Further, a method and apparatus which provide an efficient and economical treatment of the minerals are required.

When leaching minerals, ores etc. it has been proposed to treat the solid material with a leaching liquid in a bath or a tank till the desired extraction of the mineral/metal is achieved. The bath or the tank is then emptied both for solid ore material and enriched liquid, whereafter a new batch of ore material and liquid is introduced into the tank.

It has further been proposed to mix a liquid and fine-grained ore or minerals to such extent that the mixture can be pumped by means of slurry pumps or the like. In order to enable such type of mass transfer the volume of liquid is far above what is required from a process point of view, since excess of leaching liquid is introduced in order to enable transfer of the fine-grained material through the apparatus. Such excess of leaching liquid require increased treatment and pumping capacity for a given input of mineral. For one specific process, for which the present invention is particularly suited, approximately 150 m$^3$ of solid, gravel like material is to be transported pr. hour. In order to enable such volume of material to be pumped pr. hour, the volume of leaching liquid must be many times that of the solid substance, rendering such a method both unpractical and uneconomical.

Hence, the two known ways of treatment described above are uneconomical and undesired from a commercial point of view.

It is known both from experiments and from theoretical calculations that it is extremely difficult, if not impossible, to lift a gravel like material up through a vertical tube, unless the diameter of the tube exceeds its length, the main reason being the combination of friction between the gravel like material and the tube and the outwards acting horizontal forces excerted by the gravel like material on the wall.

The object of the present invention is to provide a solution which makes it possible to continuously treat a gravel like solid material with a leaching liquid and which also makes it possible to transport large volumes of ore or minerals without being dependent on excessive volumes of leaching liquid.

A further object is to provide a solution based on the so called counterflow principle, i.e. moving the gravel like solid material in one direction while the leaching liquid is flowing in the opposite direction.

A still further object of the present invention is to provide an upwards, vertical motion of the gravel like, solid substance in a relatively high and slender, preferably cylindrical bath or tank, the bath having a height which exceeds its diameter.

According to the present invention the solid, gravel like material is introduced into the bath at its lower half while the treated solid material is removed at the upper half of the bath, the gravel like, solid material being moved upwards by means of lifting members, rotating around a vertical axis. The leaching liquid is introduced into the tank at the upper end of the bath and is subsequently removed at its lower end.

The fluid is preferably introduced into the bath at a level which is below the level where the processed solid material is removed, whereby the gravel like solid material will go through a drying-up phase prior to its discharge from the tank. Such feature will enable the leaching liquor to drip off the solid material, thereby reducing the loss of leaching liquid.

According to the present invention the granular solid material is introduced into the bath through a centrally arranged, hollow tube which is rotatably arranged within the bath. One or more lifting members is connected to the vertical tube. The granular solid material is introduced into the lower half of the bath through one or more openings in the tube wall, the granular material being fed through the tube and is evenly distributed on the bath floor by means of the lifting member(s).

According to a further embodiment the lifting member(s) comprises at least one inclined, radially arranged plate, the lower edge of which rotates in the same plane as that of the bottom plate of the bath. The at least one plate is inclined upwards and backwards with respect to the direction of rotation.

A duct or a passage is formed on the underside of the inclined plates, the duct or passage communicates with the bath of the tank through openings preferably along the entire length of the plates. The opening(s) appears on the rear side of the plate with respect to the direction of rotation. The duct or passage is defined by the bottom plate and the side wall(s) of the bath and by the inclined plate. Since the duct communicates with the bath along the rear side of the plate and with the centrally arranged tube through which the gravel like material is fed into the bath, the duct or passage enables the gravel like material to be more or less evenly distributed on the bottom area of the bath when the plate(s) is rotating.

According to one preferred embodiment the lifting member(s) comprises two diametrically arranged inclined plates. The two plates are preferably fixed to the centrally arranged tube in a tangential manner.

As previously stated the present method is based on the counterflow principle, i.e. that the gravel like solid material is brought to move in one direction—in this case upwards—, while the leaching liquid is brought to flow in the opposite direction, i.e. in this case downwards. According to the present invention vertical transport upwards of a granular material in a bath where the height of the bath exceeds its diameter is made possible. In addition a more or less evenly distribution of the solid material on the total cross sectional area of the bath is achieved.

In order to promote a fuller understanding of the above and other aspects of the present invention one preferred embodiment will now be described, by way of example only, with reference to the accompanying drawings in which.

The embodiment shown in the FIGS. 1–7 is designed to be used for leaching granular ores. Concentrated hydrochloric acid is in this particular case used as a catalytic agent which, due to is high amount of heat, will be regenerated.

Figure 1:
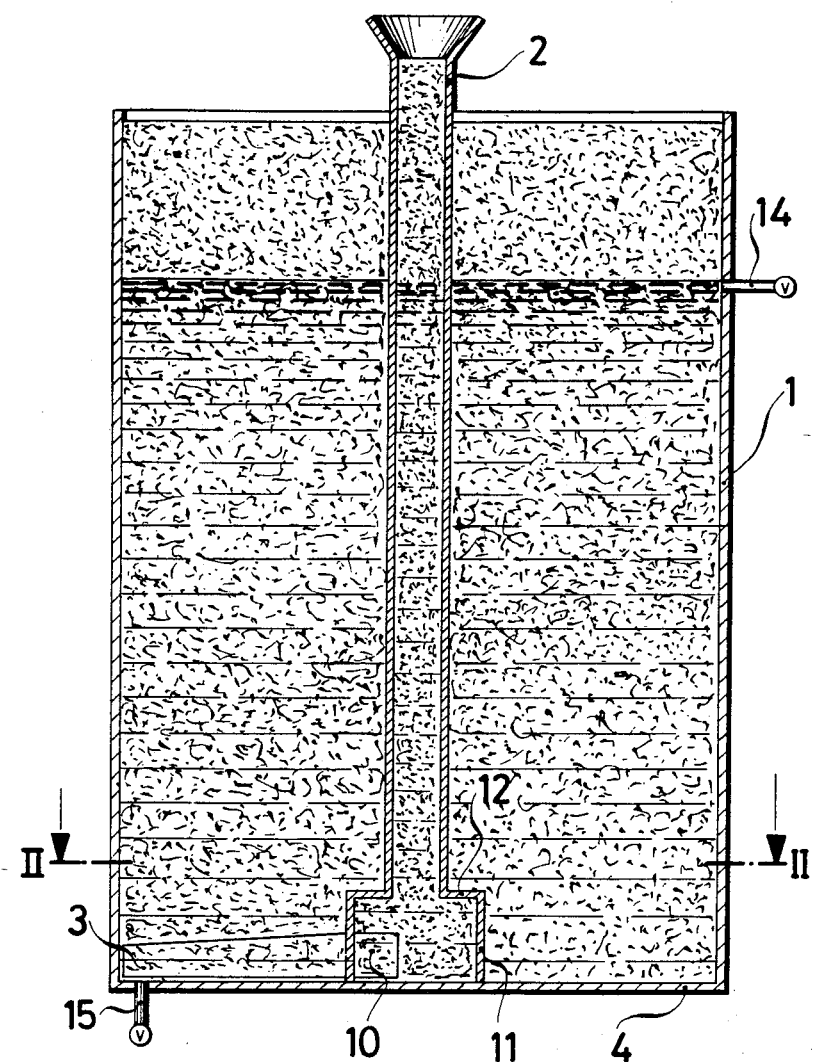
FIG. 1 shows schematically a vertical section through a bath according to the present invention.
Figure 2:
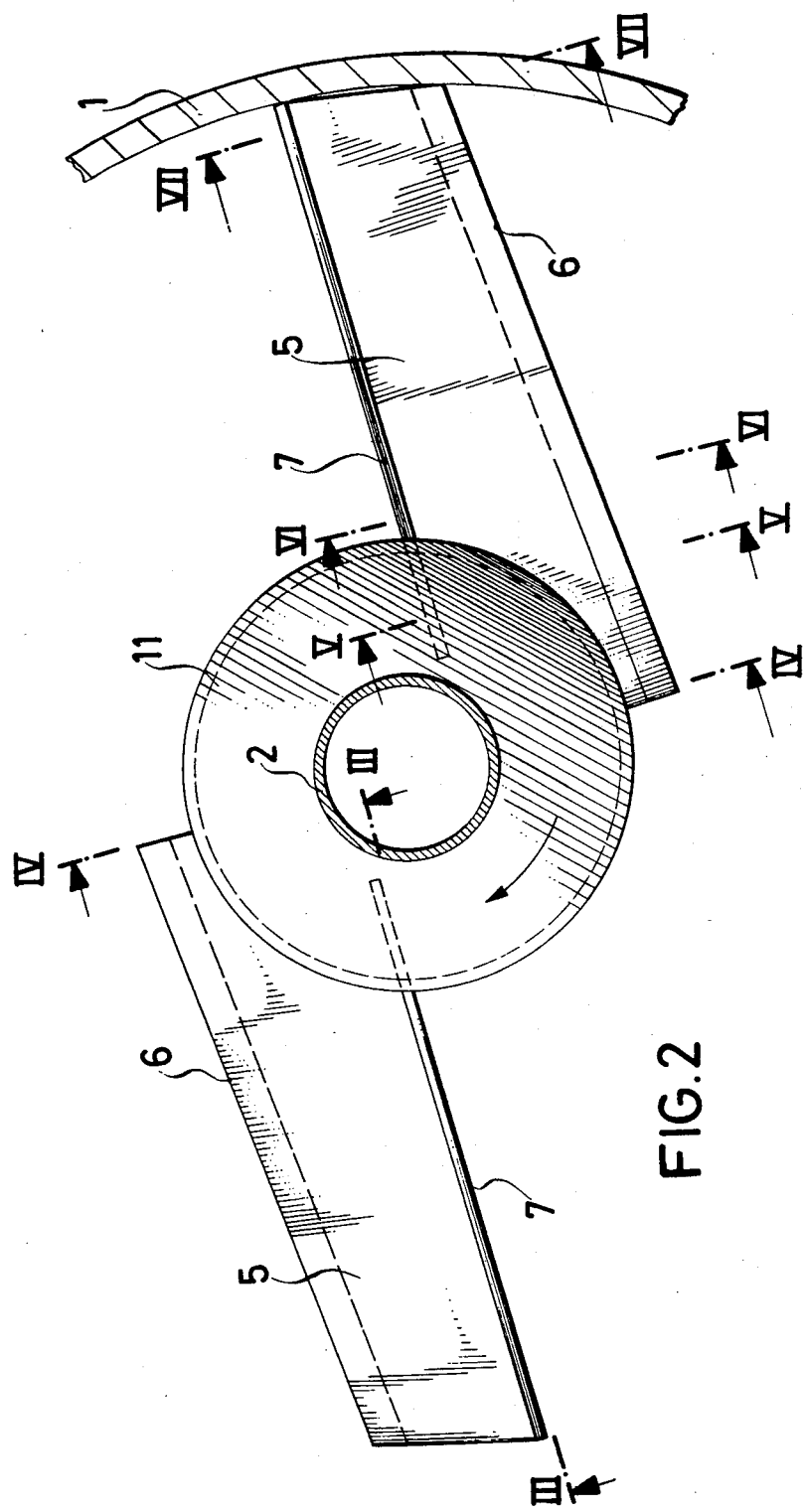
FIG. 2 shows a horizontal section through the bath and the lifting member seen along the line II—II on FIG. 1.
Figure 3:
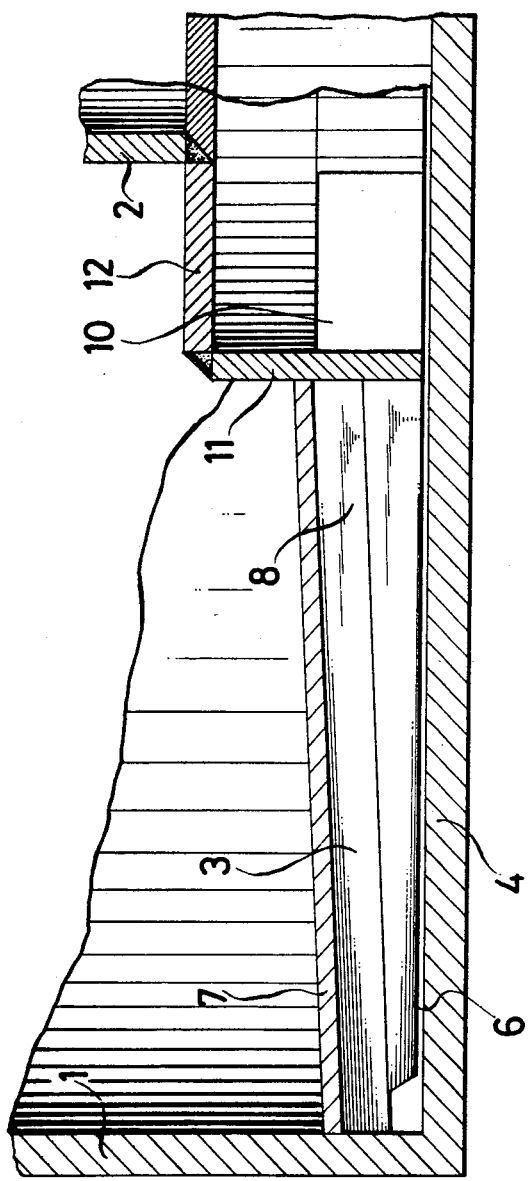
FIG. 3 shows a vertical section through one half of the lower section of the bath, seen along the line III—III on FIG. 2.
Figure 4:
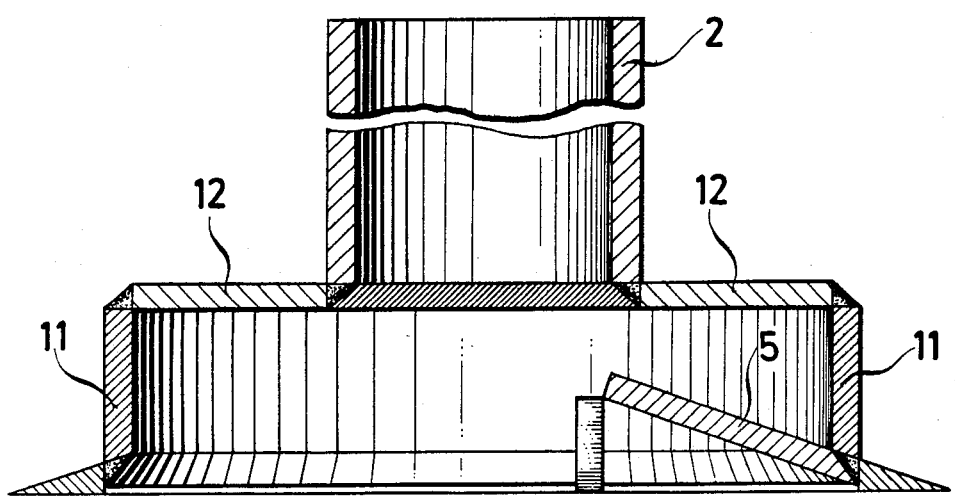
FIG. 4 shows a vertical section along line IV—IV on FIG. 2.
Figure 5:
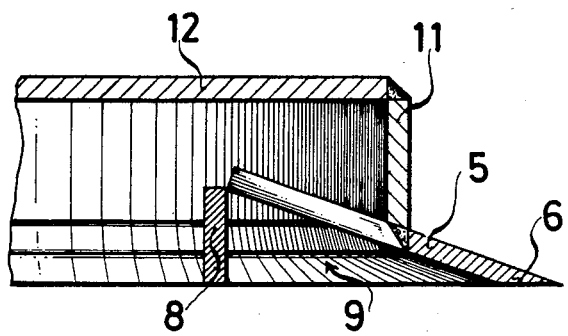
FIG. 5 shows a vertical section through one of the lifting members seen along the line V—V on FIG. 2.
Figure 6:
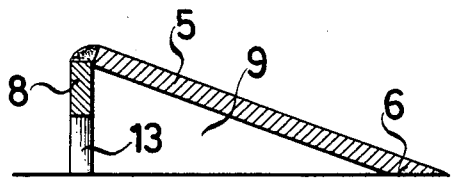
FIG. 6 shows a vertical section through the same lifting member seen along line VI—VI on FIG. 2.
Figure 7:
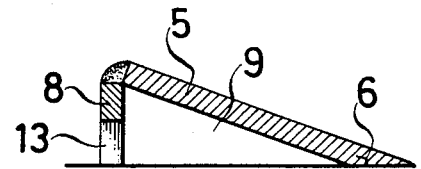
FIG. 7 shows a vertical section through the lifting member seen along line VII—VII on FIG. 2.

As shown in FIG. 1 the process equipment comprises a bath or a tank 1 preferably with a cylindrical cross-sectional area. The tank 1 houses a concentrically arranged hollow tube 2 or cylinder end of which communicates with means for supplying ore material (not shown). The tube is open in both ends. At its lower end the cylinder 2 is equipped with two radially arranged lifting members 3, one of which being shown on FIG. 1. The lifting member 3 is formed by a plate 5 which is inclined with respect to the bottom plate 4 of the bath. The lifting members 3 are diametrically arranged and are fixed to the wall of the tube 2 in a tangential manner, cfr. FIG. 2.

According to the embodiment shown in the figures the tube 2 and the lifting members 3 are designed to rotate in clockwise direction. In order to provide the required lifting effect the plates 5 are arranged in such a way that the lower edge 6 of the plates 5 rotates in a horizontal plane resting on the bottom plate 4 of the bath, the plates being inclined upwards and backwards with respect to the direction of rotation. According to this embodiment the lifting member 3 functions as a two-bladed propeller, the length of which corresponds to the diameter of the bath 1.

The rear side 7 of each inclined plate 5 is open, preferably along the entire length of the plate 5. In this manner a duct or passage 9 which is open along one side is formed, the duct 9 being otherwise defined by the bottom plate 4 of the bath 1, the side wall of the bath and the inclined plate 5. The duct 9 communicates with the hollow cylinder 2 through openings 10 in the cylinder wall, the opening being arranged at the lower end of the cylinder 2. Alternatively, the opening 13 at the rear side 7 may be constricted by means of a vertical plate 8, welded to the rear edge 7 of the plate 5. The height of the plate 8 is less than the height of the opening 13, whereby the area of the opening 13 may be reduced without reducing the inclination of the plate 5.

As shown in FIG. 3 and FIGS. 5–7 the opening 13 in the rear side of the plate 5 has decreasing height in outwards direction towards the outer end of the plates 5.

In order to reinforce the lower end of the tube 2, the tube 2 is equipped with an enlarged and strengthened section 11. The enlarged section 11 is at its upper end terminated with a horizontal, plane plate 12 which are welded both to the tube 2 and the enlarged section 11. The inclined plates 5 are rigidly fixed to the enlarged section for example by means of welding. Openings 10 are provided in the enlarged section is association with the duct 9.

The tube 2 may be rotatably suspended in the tank 1 in any conventional manner and may be rotated by means of a motor and transmission means (not shown) for example arranged at the upper end of the tube 2. It should further be appreciated that lifting members may be arranged at different levels in order to increase the lifting effect.

The mode of operation will now be described with reference to the accompanying drawings.

The tube 2 with the lifting members 3 are set in rotation. The gravel like solid material is introduced into the lower end of the bath through the hollow tube 2, while hydrochloric acid is supplied through the inlet tube 14.

Eventually the lifting members 3 will rotate in a bath 1 filled with a gravel like solid material and a liquid. During rotation the inclined plates 5 will lift the gravel like solid material up from the bottom plate 4 of the bath 1 and move the material upwards along the inclined surface of the plate 5. The rotation produces an empty volume in the duct 9 below the inclined plate, into which voids new gravel like material is introduced from the hollow tube 2 through the opening(s) 10 in the wall of the tube 2. When a two-bladed lifting means has rotated 360° around its axis the initial bottom layer of solid material in the bath 2 has been lifted twice the height of the inclined plate 5 while new solid material simultaneously has been introduced into the bottom of the bath below said initial bottom layer of material.

On the top of the bath the rotation of the lifting means is registered as a twice appearing wave per revolution of the lifting means.

If for example the lifting means comprises two inclined plates with a width of 6 cm and an inclination of 2 cm, and provided with a vertical plate 8 of 1 cm welded to the rear, upper edge of the plate 5, the opening 13 on the rear side of each plate 5 will have a height of 1 cm. By introducing granular material as described above, the granular material will due to the rotation of the plates move radially outwards in the duct 9 provided by the inclined plates 5. Due to the vertical plate 8 on the rear side 7 of each plate 5, further rotation will leave a new layer of solid material on the tank bottom, while the previously bottom layer is lifted up by the inclined blades. The height of the new layer of solid material corresponds to the height of the rearwards opening 13, which in this particular case is 1 cm.

At this instant the previously introduced bottom layer of solid material is lifted up by the inclined plate 5 to a level which corresponds to the top level of the rear end 7 of the plate 5. The solid material is restricted from falling down to its original level since a new layer of solid material automatically is introduced into the bath below the plates 5 through the opening on the rear side.

Thus the material lifted up by the plate is only allowed to fall a distance which corresponds to the height of the vertical plate 8, the material falling down on to the introduced new bottom layer.

Theoretically, the column of solid material will move upwards with a speed of twice the height of the opening per revolution of the lifting means. However, since the solid material is introduced into the bath in a relatively uncompressed state the rate of lifting is in practice smaller.

While the granular solid material is brought to move upwards in the bath, the hydrochloric acid is introduced at the upper end of the bath 1 through an inlet valve 14 and is drained off at the lower end of the bath through an outlet valve 15. The supply and draining off of leaching liquid are more or less continuous, dependent upon the rate of supply of solid material to be leached.

According to the present invention, the leaching liquid is introduced into the bath at a level below the level when treated solid materials is removed. Hence the solid material leaves the liquor at a predetermined level below the top of the bath, enabling the material to dry off before being discharged by means of for example scrapers (not shown) etc. arranged at the upper end of the bath.

I claim:

1. Apparatus for treating solid free flowing granular mineral materials with a leaching liquid comprising:
   (a) a tank having a bottom portion and a top portion;
   (b) a centrally arranged vertical tube rotatably disposed in the tank for rotation therein;
   (c) said tube having a first at least one opening in the top portion thereof at the top portion of said tank and at least one second opening, each said second opening located at a lower portion of said tube adjacent the bottom portion of said tank wherein said first opening receives a supply of solid granular mineral material which flows down through the tube and out of each said second opening and into the bottom portion of said tank;
   (d) at least one lifting plate having a front side and a rear side, each said lifting plate rigidly affixed to said tube for rotation therewith each said lifting plate being located in the bottom portion of said tank and the rear side of each said lifting plate being positioned adjacent to at least one of said second openings and forward of said second opening with respect to the direction of rotation of said tube and extending outwardly away from said tube, each said second opening having a lifting plate associated therewith;
   (e) the rear side of each said lifting plate with respect to the direction of rotation having an inclined face that slopes up and backwardly away from the direction of rotation to form a space thereunder whereby granular mineral material in said tube will flow outwardly from each said second opening and into the space beneath each said lifting plate provided by rotation thereof to supply from said space a layer of granular material in said tank;
   (f) the front side of each said lifting plate having a inclined surface whereby said granular material in said tank is lifted up and deposited on top of the layer of granular material supplied from the space beneath the rear side of said lifting plate thereby lifting said granular material up through said tank;
   (g) means for introducing leaching liquid at the top portion of the tank and means for withdrawing said liquid at the bottom portion of the tank; and
   (h) outlet opening means in the top portion of said tank for removing the treated granular material.

2. Apparatus for treating free flowing granular mineral materials with a leaching liquid comprising:
   (a) a tank having a bottom portion and a top portion;
   (b) an inlet valve means at the upper end of said tank for supplying leaching liquid into said tank and outlet valve means at the lower end of said tank for removing leaching liquid from said tank;
   (c) a centrally arranged vertical tube rotatably disposed in said tank for rotation therein about the vertical axis of the tube;
   (d) said vertical tube having an enlarged section at the lower end thereof and a first inlet opening, positioned above said inlet valve means, for receiving a supply of free flowing granular mineral material which flows down in said tube and into said enlarged section at the lower end thereof;
   (e) two diametrically opposed lifting members fixed to said enlarged section of the tube and extending outwardly therefrom, each said lifting member comprising an inclined plate having a lower edge resting on the bottom of said bath and each of said inclined plates being inclined upward and backward on the front and rear side thereof with respect to a predetermined direction of rotation of said vertical tube, the rear side of each said inclined plates forming a channel between itself and the bottom of said tank, said channel being open to the rear with respect to the direction of rotation;
   (f) said enlarged portion having apertures opening into each said channel beneath said inclined plates and each of said aperatures opens into one of said channels whereby granular material in said vertical tube will flow outwardly into the space available in each said channel to supply a layer of granular material in said tank; and
   (g) the front side of each of said inclined plates lifting and depositing a layer of granular material in said tank on top of the layer of granular material supplied from the space beneath the rear side of each of said inclined plates thereby moving said granular material up through said tank.

3. The apparatus of claim 2 wherein said lifting members decrease in height in the direction outwardly from said vertical tube.

4. The apparatus of claim 2 further comprising a substantially vertical plane attached to the rear side at the top of each inclined plate to extend downwardly from said plates to reduce the size of the opening at the rear of each of said channels positioned under the rear side of each of said plates.

5. The apparatus of claim 4 wherein the opening forming by the vertical plate at the rear of each of said channels decreases in height outwardly from said vertical tube.

6. Apparatus for treating free flowing granular material with a liquid comprising:
   (a) a tank comprising side walls and a bottom wall therein;
   (b) a vertical hollow conduit rotatably mounted in said tank;
   (c) said conduit having an inlet opening in the top portion thereof for receiving a supply of free flowing granular material which moves downwardly in the hollow conduit;

(d) said conduit having at least one outlet opening in the bottom portion thereof for supplying granular material from the conduit into the bottom of the tank;

(e) at least one lifting and distribution member fixed to the bottom portion of said conduit at the bottom of said tank for rotation therewith;

(f) the front side of each of said members that faces the direction of rotation having an inclined face that slopes up and backwardly away from the direction of rotation for lifting granular material in the tank;

(g) the rear side of each of said members with respect to the direction of rotation having an inclined face that slopes up and backwardly away from the direction of rotation to form a passage space underneath each of said members for distributing granular material in said tank;

(h) each of said lifting and distribution members being fixed to said rotating conduit in position with the rear side of each of said members in position adjacent to and forward of one of said outlet openings in the direction of rotation and with the passage space on the rear side of said member being in communication with said one of said outlet openings in said conduit to receive granular material from said opening and distribute the granular material in a layer extending outwardly toward the side wall of said tank, wherein each of said outlet openings has a lifting and distribution member associated therewith;

(i) means for introducing a liquid into the top portion of said tank and means for removing the liquid from the bottom portion of said tank whereby the granular material moving upwardly in said tank is contacted with said liquid for treatment; and (j) an outlet port in the top portion of said tank positioned above the means for introducing a liquid into said tank for removing the treated granular material.

7. The apparatus of claim 6 wherein the lifting and distribution member decreases in height in the outward direction away from the vertical conduit.

8. The apparatus of claim 6 wherein the lower portion of the hollow vertical conduit is enlarged.

9. The apparatus of claim 6 wherein there are two diametrically opposite lifting and distribution members fixed to the hollow vertical conduit.

* * * * *